3,519,690
PROCESS FOR THE SEPARATION OF ORGANIC HYDROPEROXIDES
George G. Joris, Madison, Robert Fuhrmann, Morris Plains, and David Jerolamon, Morristown, N.J., assignors to Allied Chemical Corporation, New York, N.Y., a corporation of New York
No Drawing. Filed Jan. 30, 1967, Ser. No. 612,323
Int. Cl. C07c 73/06, 73/08
U.S. Cl. 260—610
8 Claims

ABSTRACT OF THE DISCLOSURE

This specification discloses a process for the separation of liquid organic hydroperoxides, including aliphatic and aromatic hydroperoxides, from their liquid mxtures by thermal diffusion. Additionally, mixtures obtained from the oxidation of aromatic hydrocarbons having two or more alkyl substituents, which produces monohydroperoxides and polyhydroperoxides, can be subjected to thermal diffusion to separate the monohydroperoxides from the polyhydroperoxides.

---

Organic hydroperoxides are highly useful as chemical intermediates, as catalysts for the polymerization of vinyl, vinylidene and vinylene compounds, and as bleaching agents in textile manufacture. For many of these industrial uses, these hydroperoxides must be available in a hydrocarbon solution containing a high concentration of hydroperoxides. Organic hydroperoxides are prepared by the oxidation of hydrocarbons whereby mixtures of oxidation products, including the desired hydroperoxides in admixture with oxidation by-products and unreacted starting material, are produced. When aliphatic or alkyl-substituted aromatic hydrocarbons having two or more reactive sites are oxidized, the resultant mixture contains monohydroperoxide and polyhydroperoxide as well.

However, the concentration of hydroperoxides in their mixtures which are produced commercially is generally low since in practice oxidation beyond a certain peroxide content will result in excessive decomposition of the hydroperoxide. Thus, in most cases it is necessary to further concentrate the hydroperoxide mixture obtained by oxidation to a solution containing an increased proportion of hydroperoxide.

According to prior art processes, the hydroperoxides can be concentrated from their mixtures by successive distillations to remove solvent or by extraction with alkali to remove oxidation by-products, careful neutralization of the alkali and subsequent extraction of the liberated hydroperoxide in a suitable solvent. The solvent must be removed by fractional distillation.

Although these methods are available, they are unsatisfactory in several respects. For example, distillation must be conducted at low temperatures, usually below 100° C., to avoid excessive decomposition of hydroperoxide and in many instances this necessitates the use of low pressures as well which requires elaborate and expensive equipment. Extraction requires several steps which increases the cost of producing the desired hydroperoxide mixtures. Large quantities of solvent must either be evaporated, with attendant disadvantages of expense, danger of fire and explosion, air and water pollution, or the solvent must be purified and recycled, adding considerably to the cost of the process.

Additional difficulties are encountered in the prior art when a high yield of polyhydroperoxide versus monohydroperoxide is desired. As conducted in known processes, the oxidation of aromatic hydrocarbons having two or more alkyl substituents appears to be a stepwise reaction; monohydroperoxides are formed first and dihydroperoxides are formed thereafter by further oxidation of the monohydroperoxide, etc. At an increasing degree of oxidation, however, an increasing by-product formation occurs with a consequent reduction in the yield of the polyhydroperoxides desired. It is recognized in the prior art that by keeping the conversion to polyhydroperoxide products at a comparatively low level, by-product formation is minimized, but correspondingly the yields of polyhydroperoxides per pass are low and the costs of producing polyhydroperoxides are increased. However, if the monohydroperoxides were to be separated from the polyhydroperoxides and recirculated to the oxidation step, the yield of polyhydroperoxides finally obtained would be greatly increased while keeping by-product formation at a minimum. However, conventional processes, such as extraction, can separate monohydroperoxides from mixtures containing monohydroperoxides and polyhydroperoxides only slightly and with great difficulty and expense. According to the process of the present invention, these difficulties have been overcome and hydroperoxides can be separated from their mixtures simply and efficiently, and monohydroperoxides can be separated from polyhydroperoxides in similar manner.

It is a primary object of this invention to provide a simple, safe and economical process for the separation of organic hydroperoxides from their mixtures which involves the thermal diffusion of the liquid mixture.

It is another object of this invention to provide a process for the separation of hydroperoxides from reaction mixtures obtained by the oxidation of hydrocarbons.

It is a further object of this invention to provide a process for the separation of polyhydroperoxides from monohydroperoxides in liquid solutions.

Further objects and advantages will become apparent from the following detailed description.

We have found that both aliphatic and aromatic liquid hydroperoxides can be separated from liquid organic mixtures by thermal diffusion. Further, we have found that monohydroperoxides can be similarly separated from mixtures containing both monohydroperoxides and polyhydroperoxides.

According to the process of the invention, the components of a liquid organic mixture containing from about 1% to about 70% by weight of hydroperoxides may be separated by subjecting the mixture to thermal diffusion. Thermal diffusion is effected by introducing the mixture into a narrow space which is formed by two parallel surfaces or walls; by providing a temperature difference across the space by maintaining one of the walls at a higher temperature than the other wall; and by withdrawing a fraction of liquid having an increased proportion of hydroperoxide relative to the starting material from one part of the space, and withdrawing a fraction of liquid having a decreased proportion of hydroperoxide relative to the starting material from another part of the space.

The process of the invention can be adapted to mixtures containing aliphatic or aromatic hydroperoxides in a liquid solvent. Such hydroperoxides include n-butyl hydroperoxide, t-butyl hydroperoxide, cyclohexyl hydroperoxide, benzyl hydroperoxide, isopropylbenzene hydroperoxide, m-diisopropylbenzene monohydroperoxide, m-diisopropylbenzene dihydroperoxide, 1,3,5-triisopropylbenzene monohydroperoxide, 1,3,5-triisopropylbenzene dihydroperoxide, 1,3,5-triisopropylbenzene trihydroperoxide, p-cymene hydroperoxide, isopropylnaphthalene hydroperoxide, 1,2,3,4-tetrahydronaphthalene hydroperoxide and the like.

Suitable solvents which can be employed in our process include aliphatic hydrocarbons such as n-pentane, isopentane, n-hexane, 2-methylpentane, 3-methylpentane, 2,2-dimethylbutane, 2,3-dimethylbutane, dimethyl-n-propylmethane, methyldiethylmethane, trimethylethylmethane, dimethylisopropylmethane, n-heptane, 2-methylhexane, 3-methylhexane, 2,2-dimethylpentane, 2,3-dimethylpentane, 2,4-dimethylpentane, 3,3-dimethylpentane, 3-ethylpentane, 2,2,3-trimethylbutane, n-dodecane, n-nonadecane and the like; aromatic hydrocarbons such as benzene, toluene, o-xylene, m-xylene, p-xylene, ethylbenzene, n-propylbenzene, isopropylbenzene, m-diisopropylbenzene, 1,3,5-triethylbenzene, 1,3,5-triisopropylbenzene, n-butylbenzene, t-butylbenzene, pentamethylbenzene, p-cymene, mesitylene, prehnitene, isodurene, diphenylmethane and the like. Mixtures of any of the above can also be employed. In addition to hydroperoxide and solvent, other compounds can also be present in the mixture to be separated, provided only that all components be liquid at the temperatures of separation employed. For instance, the oxidation of hydrocarbons generally produces acids, ketones, higher alcohols and alkylated products as by-products in addition to the desired hydroperoxides and the hydroperoxides can be separated from these by-products as well as solvent successfully in accordance with our process.

Thermal diffusion of liquids is a process which is known but the mechanism of the process is extremely complex and is not yet completely understood nor is it predictable. However, although the invention is not to be limited to any particular principle, it can be explained generally in the following manner: The molecules of liquid at the wall having the highest temperature acquire a particular kinetic energy of displacement. This energy is different for different components of the mixture. Those molecules having a higher energy of displacement will migrate toward the cold wall while those with a lower energy of displacement will remain at the hot wall. When the walls are vertical a convection current is set up by the temperature gradient in the space between them and the liquid adjacent to the hot wall rises while the liquid adjacent to the cold wall descends. The result is that the molecules having a higher energy of displacement and concentrating near the cold wall will migrate downwardly to the lower part of the space and the molecules having the lower energy of displacement will migrate upwardly to the top part of the space. Generally, the hydroperoxides will migrate downwardly in the space and other components of a mixture will concentrate at the upper part of the space. In the case where monohydroperoxides and polyhydroperoxides are present, the monohydroperoxides will concentrate at the top of the space.

The space between the cold wall and the hot wall must be of substantially uniform width throughout the column. It can be formed by a suitable arrangement of opposed walls such as by parallel plates or concentric straight or helical tubes made of glass, stainless steel, plastic, and the like, which will conduct heat to or from heating or cooling jackets that are provided to maintain the walls at a certain selected temperature. The terms "hot" and "cold" as applied to the wall surfaces and "heating" and "cooling" as applied to temperature-controlling means are used in a relative rather than in an absolute sense. As an illustration, the hot and cold walls may be maintained at temperatures of 160° C. and 100° C. respectively, or temperatures of 0° C. and —60° C. can be maintained at the hot and cold walls respectively. Either wall can be hot or cold, arranged vertically or horizontally and no particular configuration of the apparatus used is considered to be part of the invention.

Any appropriate heating means or cooling means can be employed such as steam under pressure, boiling water, heating coils, cold water, brine solution, and the like, so that the desired temperature level is maintained. The temperature at each wall must be maintained at a constant level. The maximum temperature variation is 3° C. and preferably 1° C. or less variation is maintained so as to prevent the initiation of countercurrents opposed to the convection current in the space which would disturb the course of the separation and thus substantially lower the efficiency of the column.

The degree and rate of separation of components in a given mixture depend upon the width of the space between the walls and the temperature difference between them. The optimum width of the space and length of the walls can be determined according to the rate and degree of separation required. The width of the space generally is limited to a range between about 0.1 mm. to about 3.0 mm. Increasing the length of the walls will increase the capacity of the system as well as the degree of comparative enrichment of one component obtainable. The space between the walls can be left empty and filled entirely with the liquid mixture to be separated or it can be loosely filled with a porous, inert material such as glass wool, steel wool, sintered (porous) metal, small helixes or other small, shaped, inert fillers. When such fillers are employed, a larger width between the walls of from about 0.5 mm. to about 4.5 mm. can be used, thus increasing the capacity of a column of similar over-all length with no loss in its efficiency.

The temperatures chosen for the hot and the cold walls depend upon several factors such as the melting and boiling points of the liquid components and the decomposition point of the hydroperoxide. In general, the upper limit of the hot wall should be chosen so that less than 0.5% by weight decomposition of the hydroperoxide per hour occurs. In the case of aliphatic hydroperoxides the preferred range for the hot wall is from about 0° C. up to about 150° C. The preferred range for aromatic hydroperoxides is from about 0° C. up to about 125° C. The cold wall temperature can vary from about —100° C. up to within about 25° C. of the hot wall temperature, provided only that all of the components of the mixture remain liquid under the operating conditions. The preferred temperature range for the cold wall is from about —30° C. to about 100° C. A temperature difference between the walls of at least 25° C. and preferably from about 50° C. up to about 200° C. should be maintained for an efficient rate and degree of separation.

The process of the invention is applicable to an apparatus utilizing a batch-type, semi-continuous or continuous operation, as well as a multiple column series-type apparatus. The feed stream can be charged to a vertical column from the top, from the bottom, midway between or at a multiplicity of points along the column. In a batch operation, the separation is carried out for that period of time required to accomplish the desired separation and may vary for from several minutes to several days. A continuous operation is applicable to this invention, whereby the mixture sought to be subjected to separation is continuously added to the column, usually at about the center, and a mixture containing an enriched proportion of one component is continuously withdrawn from one end of the column and a mixture containing a depleted proportion of that component is continuously withdrawn from the other.

The invention can be further illustrated by the examples given below, but it is to be understood that the invention is not to be limited to the details described therein. In the examples all percentages are by weight.

EXAMPLE 1

A mixture containing 56.6% of isopropylbenzene hydroperoxide in isopropylbenzene was charged to a thermal diffusion column consisting of two concentric stainless steel tubes 60 inches long arranged vertically. The outer diameter of the inner tube was 1.245" and the inner diameter of the outer tube was 1.370" thus producing a space of 0.063" between the tubes. The capacity of the column was 250 ml. The outer tube was fitted with seven ports having needle valves for sampling. The inner tube was connected to a cold water source and the outer tube was surrounded with spiral round copper tubing circulating hot oil from a controlled temperature oil bath. Thermocouples located at each end of the column measured the temperature at the outer wall of each tube. The inner tube was wrapped with two layers of glass wool. The column was filled from a reservoir by attaching the bottom port to a vacuum. The outer tube was maintained at a temperature of 70° C. and the inner tube was maintained at 14° C. Samples were taken after 72, 96 and 120 hours from the top and bottom ports and analyzed for hydroperoxide by standard iodometric techniques. The results are tabulated below as milliquivalents of hydroperoxide per gram designated as meq./g.

| Meq./g. | 72 hours | 96 hours | 120 hours |
| --- | --- | --- | --- |
| Upper port | 2.11 | 0.754 | 0.882 |
| Bottom port | 8.94 | 9.39 | 9.20 |

EXAMPLE 2

A mixture of isopropylbenzene and isopropylbenzene hydroperoxide containing 12.8% (1.68 meq./g.) of isopropylbenzene hydroperoxide was charged to a thermal diffusion column as in Example 1. The hot wall temperature was maintained at 71° C. and the cold wall at 13° C. After 120 hours samples were withdrawn from each port and analyzed. Excellent separation was obtained as can be seen from the results given below wherein port 1 is the upper port.

Port:                                          Meq./g.
1 ---------------------------------------- 1.13
2 ---------------------------------------- 1.36
3 ---------------------------------------- 1.41
4 ---------------------------------------- 1.56
5 ---------------------------------------- 1.67
6 ---------------------------------------- 2.4
7 ---------------------------------------- 3.94

EXAMPLE 3

A mixture containing 15.1% of isopropylbenzene hydroperoxide in n-heptane was charged to a thermal diffusion column as in Example 1. The temperature at the hot and the cold walls was 93° C. and 13° C., respectively. After 48 hours samples were taken at each port. The results are given below wherein port 1 is the upper port.

Port:                                          Meq./g.
1 ---------------------------------------- 0.37
2 ---------------------------------------- 0.80
3 ---------------------------------------- 1.03
4 ---------------------------------------- 1.47
5 ---------------------------------------- 1.64
6 ---------------------------------------- 3.86
7 ---------------------------------------- 9.30

EXAMPLE 4

This example demonstrates a semicontinuous or a continuous separation process. A mixture of isopropylbenzene hydroperoxide and n-heptane containing 14.9% of hydroperoxide (1.96 meq./g.) was charged to a thermal diffusion column as in Example 1. The temperatures maintained at the hot and cold walls were 94° and 14° C., respectively. After allowing 40 hours for equilibrium to be attained, 1.0 ml. samples withdrawn from the upper and lower ports at one-hour intervals.

The volume of liquid as it is removed from the column was replenished through the third port from the top of the column by constant head gravity feed. The results are given below.

| Time, hrs. | Upper port, meq./g. | Bottom port, meq./g. |
| --- | --- | --- |
| 40 | 0.692 | 5.74 |
| 41 | 0.878 | 7.22 |
| 42 | 0.862 | 7.09 |
| 43 | 1.0 | 6.95 |
| 44 | 0.77 | 5.86 |
| 45 | 0.81 | 6.10 |
| 46 | 0.83 | 6.3 |
| 47 | 0.80 | 6.1 |
| 48 | 0.79 | 5.7 |
| 49 | 0.79 | 5.8 |
| 50 | 0.80 | 6.3 |

EXAMPLE 5

A mixture containing 7.29% t-butyl hydroperoxide (1.62 meq./g.) in n-heptane was charged to a thermal diffusion column as in Example 1. The temperature maintained at the hot and cold walls were 71.0° and 13° C., respectively. After 24 hours 0.59 meq./g. of hydroperoxide was found at the upper port and 4.06 meq./g. was found at the bottom port.

EXAMPLE 6

A mixture containing 10.0% of t-butyl hydroperoxide in isopropylbenzene was charged to a thermal diffusion column as in Example 1. The temperature maintained at the hot and the cold walls were 93° and 13° C., respectively. After 24 hours 1.41 meq./g. of hydroperoxide was found at the upper port and 2.73 meq./g. was found at the bottom port.

EXAMPLE 7

A solution containing about 90% hydroperoxide and about 7% of oxygenated by-products derived from the oxidation of meta-diisopropylbenzene was diluted with m-diisopropylbenzene to a mixture containing about 25% of hydroperoxides. This mixture, containing 2.97 meq./g. of hydroperoxides, was charged to a thermal diffusion column as in Example 1. The temperatures maintained at the hot and the cold walls were 70° and 14° C., respectively. After 72 hours, the column was drained and the hydroperoxide content of the fractions determined. Excellent separation was obtained as can be seen from the results below where port 1 is the upper port.

Port:                                          Meq./g.
1 ---------------------------------------- 1.14
2 ---------------------------------------- 1.07
3 ---------------------------------------- 1.44
4 ---------------------------------------- 1.95
5 ---------------------------------------- 2.62
6 ---------------------------------------- 4.46
7 ---------------------------------------- 6.93

EXAMPLE 8

Meta-diisopropylbenzene was oxidized to a product containing about 90% of hydroperoxides and diluted with m-diisopropylbenzene to a mixture containing 4.46 meq./g. of hydroperoxides. 122 milliliters of this mixture was charged to a thermal diffusion column consisting of two concentric pyrex tubes arranged vertically. The inner tube had an outer diameter of 23 mm. A coiled length of copper tubing circulating oil from a controlled temperature oil bath was inserted into the tube. The outer tube, which was connected to a cold water source, had an inner diameter of 25 mm. resulting in a 1 mm. space between the tubes. The inner tube was wrapped with two layers of glass wool before insertion into the outer tube. The outer tube was fitted with three ports—one each near the top and the bottom and one in the center, each fitted with stopcocks. The column was filled from a reservoir attached to the bottom port by evacuating at the upper port. The temperatures maintained at the hot and cold walls were 83° and 14° C., respectively. After 48 hours several fractions were collected and analyzed. The top fraction contained 2.80 meq./g. of hydroperoxides and the bottom fraction contained 6.13 meq./g.

The ratio of m-diisopropylbenzene monohydroperoxide to m-diisopropylbenzene dihydroperoxide in mixtures containing both can be determined by a column chromatographic separation followed by iodometric analysis as disclosed by Kucher et al., Metody Khim. Analiza, 27, No. 11, 1331 (1961). The mixture was charged to a column containing silica gel which had been washed previously first with absolute ethanol and then with n-heptane. The monohydroperoxide can be eluted with a mixture containing 99 parts of n-heptane and 1 part of absolute ethanol. The dihydroperoxide is then eluted with absolute ethanol. The ratio of monohydroperoxide to dihydroperoxide is calculated from the results of iodometric analysis.

Following the procedure given above, the ratio of monohydroperoxide to dihydroperoxide of the starting mixture was 3.02:1; that of the top layer after separation by thermal diffusion 5.4:1; and that of the bottom layer 2.2:1. The upper layer of the mixture, which contains most of the monohydroperoxide, can be withdrawn and recirculated to the oxidation step to increase the over-all yield of dihydroperoxide.

It will be apparent that many modifications and variations may be effected without departing from the scope of the novel concepts of the present invention and the illustrative details disclosed are not to be construed as imposing undue limitations on the invention.

We claim:
1. A process for the separation of liquid organic hydroperoxides of a hydrocarbon of up to 15 carbon atoms from liquid organic mixtures containing said hydroperoxides and an alkyl, aryl or alkaryl hydrocarbon solvent which comprises introducing a mixture containing from about 1% to about 70% by weight of organic hydroperoxides and said solvent into a space having a substantially uniform width of from about 0.5 mm. to about 4.5 mm. formed by two parallel walls arranged vertically, maintaining one of said walls at a temperature from about 0° C. up to about 150° C. and maintaining the other of said walls at a temperature from about −50° C. up to about 125° C., and maintaining a constant temperature difference of at least 25° C. between said walls; and withdrawing a fraction containing an increased proportion of hydroperoxide relative to the starting mixture from the upper part of said space.

2. A process according to claim 1 wherein the introduction of said mixture into said space is continuous and the withdrawal of said fractions are continuous.

3. A process according to claim 1 wherein said mixture contains an aliphatic hydroperoxide and an aliphatic hydrocarbon solvent.

4. A process according to claim 1 wherein said mixture contains an aliphatic hydroperoxide and an aryl or alkaryl hydrocarbon solvent.

5. A process according to claim 1 wherein said mixture contains an aromatic hydroperoxide and an aryl or alkaryl hydrocarbon solvent and the hot wall temperature is maintained from about 0° C. up to about 125° C.

6. A process according to claim 1 wherein said mixture contains an aromatic hydroperoxide and an aliphatic hydrocarbon solvent and the hot wall temperature is maintained from about 0° C. up to about 125° C.

7. A process for the separation of liquid organic monohydroperoxides of a hydrocarbon of up to 15 carbon atoms from liquid organic di- or trihydroperoxides in mixtures containing said hydroperoxides, and said hydrocarbon and oxidation products of said hydrocarbon or an alkyl, aryl or alkaryl hydrocarbon solvent said mixture containing from about 1% to about 70% by weight of said hydroperoxides which comprises introducing said mixture into a space having a substantially uniform width of from about 0.5 mm. to about 4.5 mm. formed by two parallel walls arranged vertically; maintaining one of said walls at a temperature from about 0° C. up to about 125° C. and maintaining the other of said walls at a temperature from about −50° C. up to about 100° C. and maintaining a constant temperature difference of at least 25° C. between said walls; withdrawing a fraction containing an increased proportion of di- or trihydroperoxide relative to the starting mixture from the lower portion of said space and withdrawing a fraction containing an increased proportion of monohydroperoxide relative to the starting mixture from the upper portion of said space.

8. A process according to claim 4 wherein said mixture containing m-diisopropylbenzene and oxidation products of m-diisopropylbenzene is obtained from the oxidation of m-diisopropylbenzene and contains from about 15% up to about 70% by weight of total hydroperoxides and a fraction containing an increased proportion of m-diisopropylbenzene dihydroperoxide relative to the starting mixture is withdrawn from the lower portion of said space and a fraction containing an increased proportion of m-diisopropylbenzene monohydroperoxide relative to the starting mixture is withdrawn from the upper portion of said space.

No references cited.

BERNARD HELFIN, Primary Examiner
W. B. LONE, Assistant Examiner

U.S. Cl. X.R.
210—72, 176

PO-1050
(5/69)

UNITED STATES PATENT OFFICE
CERTIFICATE OF CORRECTION

Patent No. 3,519,690                    Dated July 7, 1970

Inventor(s) George G. Joris, Robert Fuhrmann, and David Jerolamon.

It is certified that error appears in the above-identified patent and that said Letters Patent are hereby corrected as shown below:

Claim 8, line 33, "4" should be --7--.

SIGNED AND
SEALED
OCT 13 1970

(SEAL)
Attest:

Edward M. Fletcher, Jr.
Attesting Officer

WILLIAM E. SCHUYLER, JR.
Commissioner of Patents